United States Patent
Issa et al.

(10) Patent No.: US 8,948,144 B1
(45) Date of Patent: Feb. 3, 2015

(54) SYSTEM AND METHOD FOR CREATING A PREFERENTIAL AD-HOC NETWORK

(75) Inventors: Alfredo C. Issa, Apex, NC (US); Sid Stafford, Durham, NC (US); Jens Hillen, Peterborough, NH (US)

(73) Assignee: Qurio Holdings, Inc., Raleigh, NC (US)

( * ) Notice: Subject to any disclaimer, the term of this patent is extended or adjusted under 35 U.S.C. 154(b) by 2594 days.

(21) Appl. No.: 11/318,981

(22) Filed: Dec. 27, 2005

(51) Int. Cl.
*H04W 4/00* (2009.01)

(52) U.S. Cl.
USPC .............. 370/338; 455/412.1; 455/414.1; 455/414.3; 455/462; 455/463

(58) Field of Classification Search
USPC ......... 370/338; 455/412.1, 414.1, 414.3, 462, 455/463
See application file for complete search history.

(56) References Cited

U.S. PATENT DOCUMENTS

| | | | |
|---|---|---|---|
| 5,666,661 A | 9/1997 | Grube et al. | |
| 5,995,500 A | 11/1999 | Ma et al. | |
| 6,020,810 A | 2/2000 | Har-Even | |
| 6,052,122 A | 4/2000 | Satcliffe et al. | |
| 6,415,146 B1 | 7/2002 | Caproo | |
| 6,542,749 B2 | 4/2003 | Tanaka et al. | |
| 6,549,768 B1 | 4/2003 | Fraccaroli | |
| 6,580,704 B1 | 6/2003 | Wellig et al. | |
| 6,744,750 B1 | 6/2004 | Berger | |
| 6,819,919 B1 | 11/2004 | Tanaka | |
| 2002/0090911 A1 | 7/2002 | Evans et al. | |
| 2003/0028623 A1 | 2/2003 | Hennessey et al. | |
| 2003/0045296 A1 | 3/2003 | Burr | |
| 2003/0120734 A1 | 6/2003 | Kagan et al. | |
| 2003/0126213 A1 | 7/2003 | Betzler | |
| 2003/0204605 A1 | 10/2003 | Hudson et al. | |
| 2003/0227479 A1* | 12/2003 | Mizrahi et al. ............. | 345/753 |
| 2004/0002348 A1 | 1/2004 | Fraccaroli | |
| 2004/0009750 A1 | 1/2004 | Beros et al. | |
| 2004/0120298 A1 | 6/2004 | Evans et al. | |
| 2004/0185881 A1 | 9/2004 | Lee et al. | |
| 2004/0203363 A1 | 10/2004 | Carlton et al. | |
| 2005/0038876 A1* | 2/2005 | Chaudhuri ................... | 709/219 |

(Continued)

FOREIGN PATENT DOCUMENTS

WO   WO 2004/080103 A1   9/2004

OTHER PUBLICATIONS

Ian Clarke et al., "Freenet: A Distributed Anonymous Information Storage and Retrieval System", Jul. 1, 2000.
SyncTap: synchronous user interactions for spontaneous device associations, http://www.csl.sony.co.jp/IL/projects/sync/contents.html.
Orb Networks Home Page, http://www.orb.com.
Outhink Media Home Page, http://www.outhink.com.
No Author, "Ad hoc protocol list," (website), obtained Dec. 12, 2005, 9 pages, http://en.wikipedia.org/wiki/Ad_hoc_protocol_list.

(Continued)

*Primary Examiner* — Patrick Edouard
*Assistant Examiner* — Chuck Huynh
(74) *Attorney, Agent, or Firm* — Withrow & Terranova, PLLC

(57) ABSTRACT

A system and method are provided for identifying participants for a preferential ad-hoc network using a peer-to-peer (P2P) network and then establishing the ad-hoc network with the identified participants. In general, an initiating peer node provides a request for participants for an ad-hoc network to the P2P network, wherein the request includes content information describing content stored at the initiating peer node. The content information is used by the peer nodes receiving the request to determine whether to join the ad-hock network. The peer nodes receiving the request that decide to join the ad-hoc network respond to the initiating peer node via the P2P network. All or select ones of the peer nodes responding to the request are identified as the participants for the ad-hoc network. Once the participants are identified, the initiating peer node dynamically establishes the ad-hoc network with the identified participants.

18 Claims, 4 Drawing Sheets

(56) References Cited

U.S. PATENT DOCUMENTS

2005/0174975 A1    8/2005    Mgrdechian et al.
2005/0221813 A1*  10/2005  Rajahalme et al. ........ 455/422.1
2006/0008256 A1    1/2006    Khedouri et al.
2006/0053208 A1*  3/2006   Laurila et al. ................. 709/206

OTHER PUBLICATIONS

No Author, "Mobile Ad-hoc Networks (manet) Charter," (website charter), Mar. 24, 2006, 3 pages, http://www.ietf.org/html.charters/manet-charter.html.

* cited by examiner

SYSTEM AND METHOD FOR CREATING A PREFERENTIAL AD-HOC NETWORK

FIELD OF THE INVENTION

The present invention relates to creating an ad-hoc network and more specifically relates to using a peer-to-peer (P2P) network to identify participants for an ad-hoc network.

BACKGROUND OF THE INVENTION

In numerous situations, a user of a network device may desire to form an ad-hoc network with other network devices. An ad-hoc network is a network that is dynamically created using immediately available network nodes for a given purpose. For example, the user may desire to form an ad-hoc network for private communications, for social interactions, for file transfers, and the like. However, in order to form an ad-hoc network, the network device must first identify the other network nodes, or participants, for the ad-hoc network. Thus, there is a need for a system and method for identifying participants for an ad-hoc network and then establishing the ad-hoc network.

SUMMARY OF THE INVENTION

The present invention provides a system and method for identifying participants for a preferential ad-hoc network using a peer-to-peer (P2P) network and then establishing the ad-hoc network with the identified participants. In general, an initiating peer node provides a request for participants for an ad-hoc network to the P2P network, wherein the request includes content information describing content stored at the initiating peer node. The content information is used by the peer nodes receiving the request to determine whether to join the ad-hock network. The peer nodes receiving the request that decide to join the ad-hoc network respond to the initiating peer node via the P2P network. All or select ones of the peer nodes responding to the request are identified as the participants for the ad-hoc network. Once the participants are identified, the initiating peer node dynamically establishes the ad-hoc network with the identified participants. The ad-hoc network is logically, and optionally physically, distinct from the P2P network.

More specifically, the peer nodes that receive the request, which are referred to as receiving peer nodes, decide whether to join the ad-hoc network based on the content information for the initiating peer node. In one embodiment, the receiving peer nodes compare the content information of the initiating peer node to their own content information to provide compatibility scores and decide whether to join the ad-hoc network based on the compatibility scores. The receiving nodes that decide to join the ad-hoc network connect to the initiating peer node using the P2P network and send their content information, compatibility scores, or both their content information and their compatibility scores to the initiating peer node.

In order to identify all or select ones of the receiving peer nodes responding to the request as the participants for the ad-hoc network, the initiating peer node selects one or more of the receiving peer nodes that responded to the request to invite to join the ad-hoc network based on the content information for the receiving nodes, the compatibility scores, or both and sends invitations to join the ad-hoc network to the selected receiving peer nodes. Optionally, the invitation may include the content information for all of the invited peer nodes. Based on the content information for all of the invited peer nodes, the invited peer nodes may decide whether to accept their invitations to join the ad-hoc network. If the invited peer nodes decide to accept the invitations, they send acceptances to the initiating peer node. Once the acceptances are received, the initiating peer node identifies the invited peer nodes that accepted the invitations as the participants for the ad-hoc network. Once the participants are identified, the initiating peer node establishes the ad-hoc network with the participants.

In one embodiment, the ad-hoc network is a Virtual Private Network (VPN) hosted by the initiating peer node. In another embodiment, the ad-hoc network is another P2P network. In yet another embodiment, the ad-hoc network is a network configured in a client/server configuration, wherein the initiating node operates as the server.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a system and method for identifying participants for a preferential ad-hoc network using a peer-to-peer (P2P) network and then establishing the ad-hoc network with the identified participants. In general, an initiating peer node provides a request for participants for an ad-hoc network to the P2P network, wherein the request includes content information describing content stored at the initiating peer node. The content information may describe all of the content stored at the initiating peer node or a select portion thereof. The content information is used by the peer nodes receiving the request to determine whether to join the ad-hock network. The peer nodes receiving the request that decide to join the ad-hoc network respond to the initiating peer node via the P2P network. All or select ones of the peer nodes responding to the request are identified as the participants for the ad-hoc network. Once the participants are identified, the initiating peer node dynamically establishes the ad-hoc network with the identified participants. The ad-hoc network is logically, and optionally physically, distinct from the P2P network.

Figure 1:
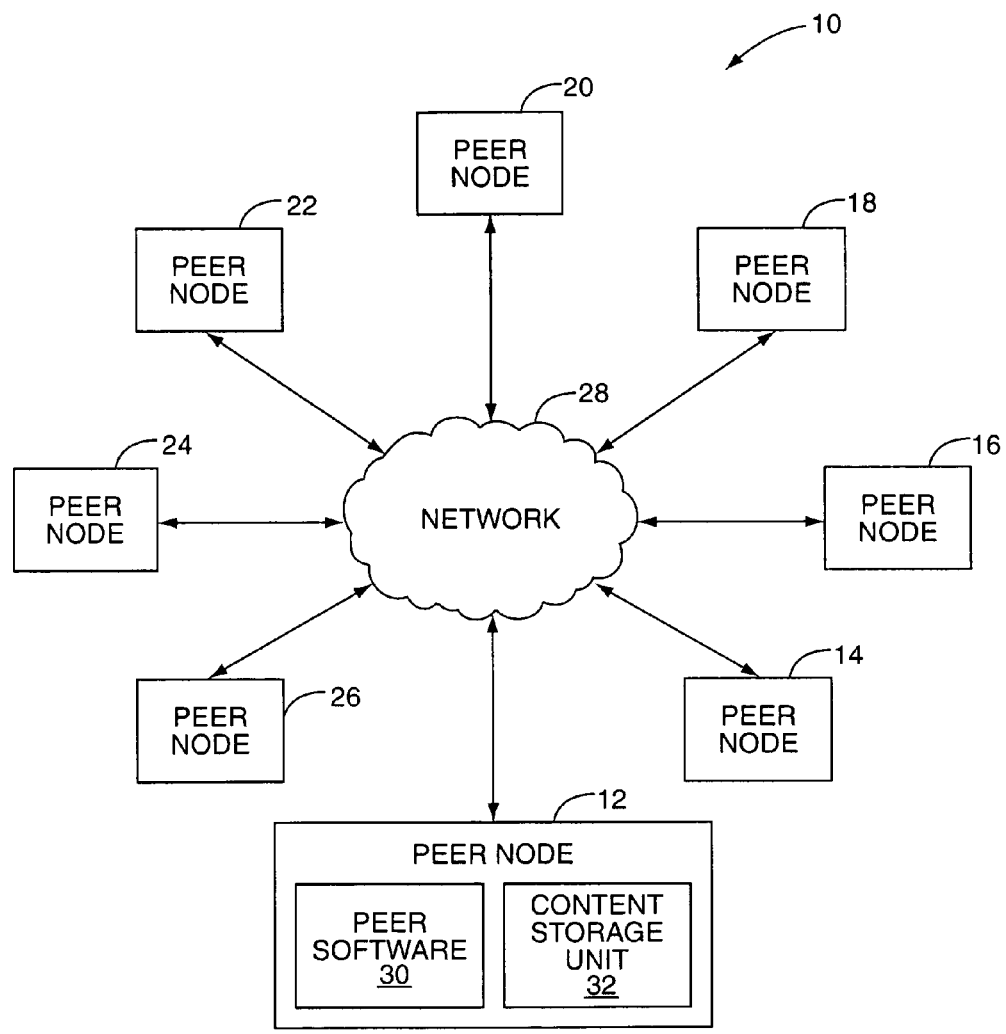
FIG. 1 illustrates a communications system including a number of peer node logically configured as first exemplary embodiment of a peer-to-peer (P2P) network.

FIG. 1 illustrates a first exemplary embodiment of communications system 10 according to one embodiment of the present invention. The communications system 10 includes a number of peer nodes 12-26 communicatively coupled by a core network 28. Preferably, the core network 28 is the Internet. The peer nodes 12-26 are logically configured to communicate via the core network 28 as a peer-to-peer (P2P) network. While eight peer nodes are illustrated, the communications system 10 may include any number of peer nodes. The peer nodes 12-26 may be personal computers, Personal Digital Assistants (PDAs), mobile telephones, or the like and have a connection, such as a wired or wireless connection, to the core network 28. As illustrated, the peer node 12 includes peer software 30 and a content storage unit 32. The peer software 30 enables the peer node 12 to communicate with the other peer nodes 14-26 via the core network 28. As discussed below in more detail, the peer software 30 enables the peer node 12 to select participants for an ad-hoc network using the P2P network and thereafter establish the ad-hoc network with the selected participants. Like the P2P network, the ad-hoc network is a logical network formed on top of the core network 28. The content storage unit 32 may be memory such as Random Access Memory (RAM) or a storage device such as a hard disc drive or the like. The content storage unit 32 stores content such as digital images, digital videos, digital audio files such as music, and the like, which may be referred to as digital assets.

Figure 2:
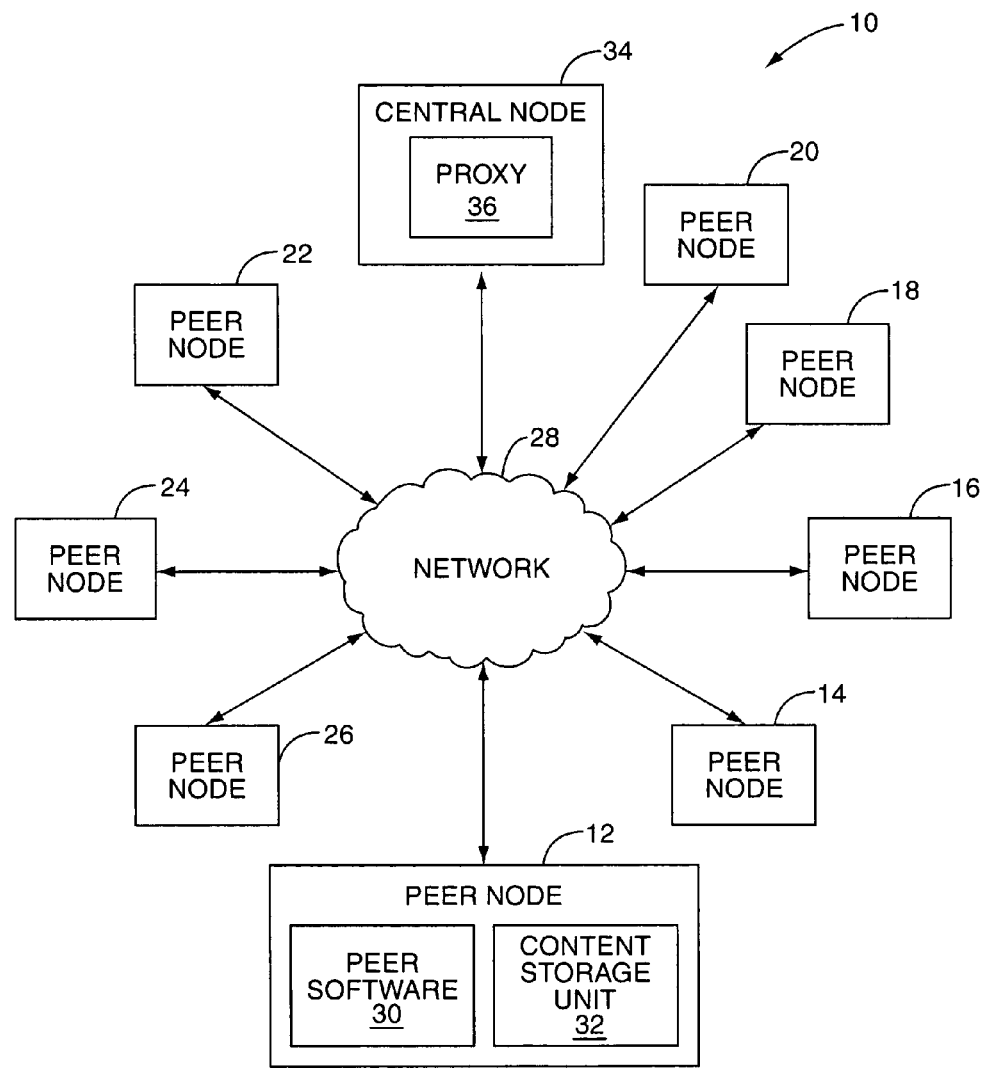
FIG. 2 illustrates a communications system including a number of peer node and a central node logically configured as a second exemplary embodiment of a P2P network.

FIG. 2 illustrates a second exemplary embodiment of the communications system 10. In this embodiment, the peer nodes 12-26 and a central node 34 are logically configured as a hybrid P2P network wherein communication between the peer nodes 12-26 is established through a central node 34. The central node 34 includes a proxy 36, which may be implemented as software, hardware, or a combination thereof and operates to direct communications between the peer nodes 12-26. For example, the peer software 30 may operate to establish a socket connection between the peer node 12 and the central node 34, where the socket connection remains open while the peer node 12 is online. Likewise, socket connections may be established between the peer nodes 14-26 and the central node 34. Thus, as an example, a request message may be communicated from the peer node 12 to the peer node 14 by first sending the request message to the central node 34 via the socket connection between the peer node 12 and the central node 34. The central node 34 may then identify the socket connection connecting the central node 34 to the peer node 14 and send the request message to the peer node 14 via the identified socket connection. It should be noted that the embodiments of the P2P network illustrated in FIGS. 1 and 2 are merely exemplary. Numerous variations will be apparent to one of ordinary skill in the art upon reading this disclosure.

Figure 3:
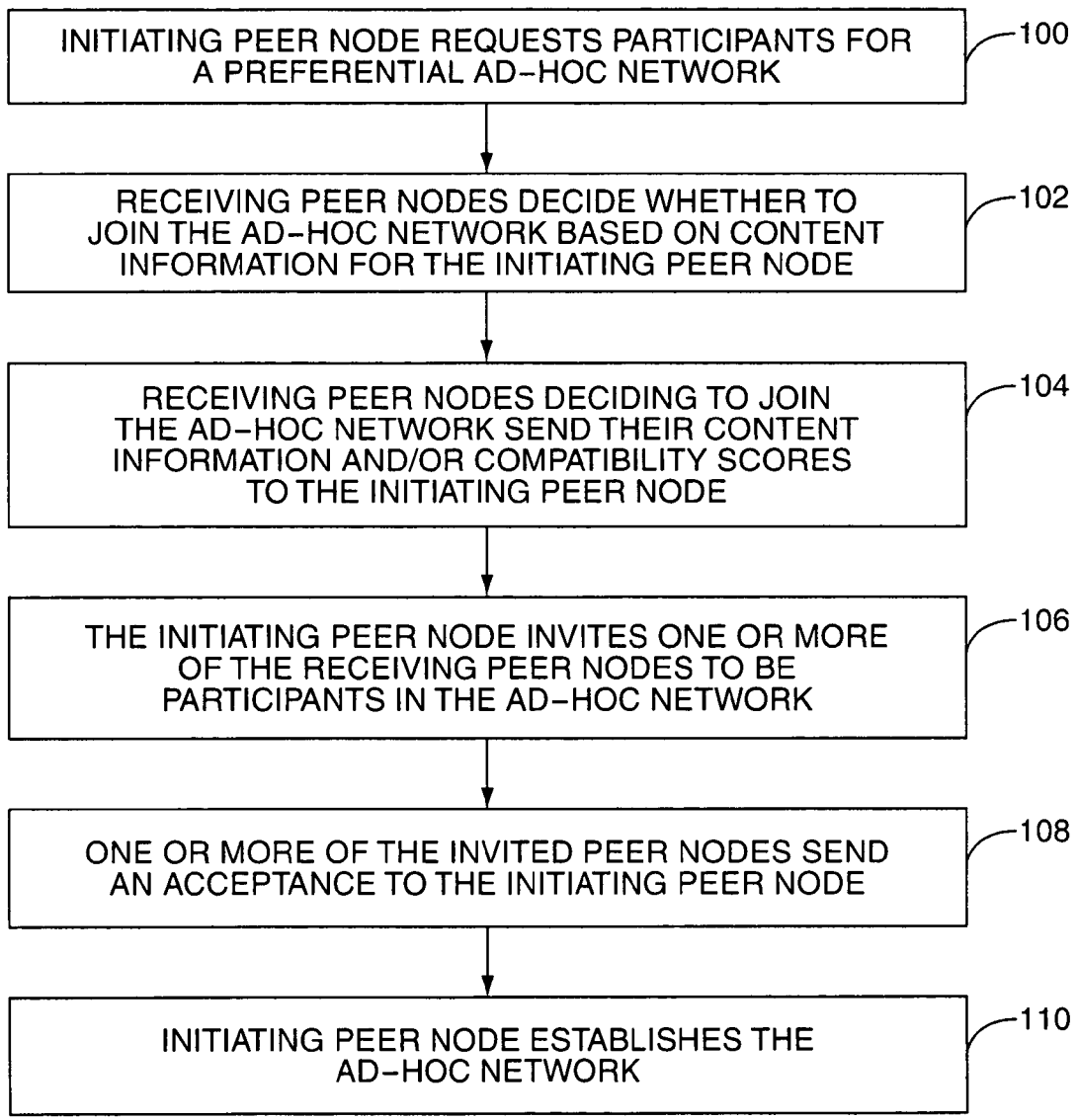
FIG. 3 illustrates a method for creating a preferential ad-hoc network using a P2P network for participant selection according to one embodiment of the present invention.

FIG. 3 illustrates a method of using a P2P network such as that illustrated in FIGS. 1 and 2 to select participants for a preferential ad-hoc network according to one embodiment of the present invention. The preferential ad-hoc network may be a Virtual Private Network (VPN) or Darknet hosted by one of the peer nodes 12-26, a second P2P network, or a network configured in a client server arrangement. The term "Darknet" is used herein to describe a VPN hosted by a peer node rather than a central server. Preferably, the ad-hoc network is formed over the core network 28. However, note that the ad-hoc network is logically distinct from the P2P network.

First, an initiating peer node, which for this example is the peer node 12, requests participants for a preferential ad-hoc network (step 100). More specifically, a user associated with the peer node 12 may first request that the ad-hoc network be created and optionally define some secret criteria, as discussed below in more detail. After the user requests that the ad-hoc network be created, the peer node 12, and more specifically the peer software 30, obtains content information describing the content stored in the content storage unit 32 or a portion thereof. For example, the user may desire that the content information include only the content information for a particular subset of the content stored in the content storage unit 32 in order to more specifically identify participants for the ad-hoc network.

For each digital image stored in the content storage unit 32, the content information may include one or more tag values such as one or more International Press Telecommunications Council (IPTC) or Exchangeable Image File Format (EXIF) tag values. The tag values may include, but are not limited to, keywords, captions, location of capture, and date and time of capture. For each video file stored in the content storage unit 32, the content information may include a genre, title, and list of one or more actors or actresses starring in each video stored in the content storage unit 32. Note that the content information may be stored within the digital asset files or within an application file associated with the digital assets. For example, the content information for digital images may be stored as part of the headers of the digital image file.

Once the content information is obtained, the peer node 12 provides a request including the content information, an identifier (ID) of the peer node 12, and a network address of the peer node 12 to one or more of the peer nodes 14-26 either known to the peer node 12 or identified by the user of the peer node 12. Optionally, the request may also include a timestamp identifying a time at which the request is generated and a Time to Live (TTL). After the TTL has expired, the request may no longer be valid and may be ignored by the peer nodes 14-26 in the P2P network. In one embodiment, the request is provided as an Extensible Markup Language (XML) request. Preferably, the request operates as a flooding query such that the request is propagated through the P2P network. For example, the peer node 12 may provide the request to the peer nodes 14-18, which in turn provide the request to the peer nodes 20-26.

Upon receiving the request, the peer nodes 14-26, which are referred to as receiving nodes, decide whether to join the ad-hoc network based on the content information for the peer node 12 contained in the request (step 102). Due to the propagation of the request through the P2P network, the request may be received by the peer nodes 14-26 more than once. In order to prevent processing the request more than once, the peer nodes 14-26 may maintain internal tables identifying requests that have already been processed.

In order to decide whether to join the ad-hoc network, the peer node 14 may compare the content information for the peer node 12 with content information describing the content stored at the peer node 14 to provide a compatibility score. For example, for video content, the compatibility score may be the number of "hits" of identical content, genres, artists, episodes, production studio, or the like or any combination thereof. Likewise, the peer nodes 16-26 may compare the content information for the peer node 12 with their own content information to provide compatibility scores. The receiving nodes 14-26 may then automatically decide whether to join the ad-hoc network by comparing the compatibility scores with some predetermined threshold. Alternatively, the receiving nodes 14-26 may communicate the compatibility scores and optionally the content information for the peer node 12 to associated users by, for example, displaying the compatibility scores and the content information or a subset thereof to the users at the peer nodes 14-26. The users may then select whether to join the ad-hoc network based on the compatibility score and optionally the content information for the peer node 12.

The peer nodes 14-26 that desire to join the ad-hoc network then connect to the peer node 12 via the P2P network and send their content information, their compatibility scores, or both their content information and their compatibility scores to the peer node 12 (step 104). In this example, it will be assumed that the peer nodes 14-20 desire to join the ad-hoc network. The peer node 12 then decides whether to invite the peer nodes 14-20 to join the ad-hoc network based on their content information, their compatibility scores, or both their content information and their compatibility scores. More specifically, the peer node 12 may search the content information from the peer nodes 14-20 for one or more secret criterion defined by the user of the peer node 12. For example, the secret criterion may be a particular video by Disney studios. If the content information from the peer node 14 includes the secret criterion, then the peer node 14 may be identified as a peer node to be invited to join the ad-hoc network. Likewise, if the content information from the peer nodes 16-20 includes the secret criterion, then the peer nodes 16-20 may be identified as peer nodes to be invited to join the ad-hoc network.

Additionally or alternatively, the peer node 12 may decide whether to invite the each of the peer nodes 14-20 based on their compatibility scores. In one embodiment, the compatibility scores of the peer nodes 14-20 are compared to a predetermined threshold value and automatically identified as peer nodes to be invited if their compatibility scores exceed the predetermined threshold. In another embodiment, the peer node 12 may decide to invite a number of the peer nodes 14-20 having the highest compatibility scores. In yet another embodiment, the compatibility scores of the peer nodes 14-20 and optionally the content information for the peer nodes 14-20 may be displayed to the user of the peer node 12, wherein the user selects one or more of the peer nodes 14-20 to invite based on the compatibility scores and optionally the content information of the peer nodes 14-20.

Once the peer node 12 has identified the ones of the peer nodes 14-20 to invite to join the ad-hoc network, the peer node 12 sends invitations to the ones of the peer nodes 14-20 to invite via the P2P network (step 106). In this example, it will be assumed that the peer nodes 14-20 are each invited to join the ad-hoc network. Optionally, the peer node 12 may store the content information for the peer nodes 14-20, and the invitations may include the content information the peer nodes 14-20 that are invited to join the ad-hoc network. The invitation may also include the content information for the peer node 12.

Upon receiving the invitation to join the ad-hoc network, the peer nodes 14-20 send an acceptance to the peer node 12 (step 108). Optionally, before sending the acceptance, each of the peer nodes 14-20 may decide whether to accept the invitation based on the content information for the other peer nodes, which in the example are the peer nodes 14-20, that are invited to join the ad-hoc network. For example, the peer node 14 may decide whether to accept the invitation based on one or more compatibility scores provided based on a comparison of the content information for the peer node 14 and the content information for the peer nodes 16-20. The determination as to whether to accept the invitation may be made automatically by the peer node 14 or through interaction with the user of the peer node 14. Likewise, the peer nodes 16-20 may optionally decide whether to accept the invitation to join the ad-hoc network.

In this example, it will be assumed that the peer nodes 14-20 accept the invitation to join the ad-hoc network. Upon receiving the acceptances from the peer nodes 14-20, the peer node 12 establishes the ad-hoc network (step 110). In one embodiment, the peer node 12 may define a limit to the number of participants in the ad-hoc network. For example, if the limit is three participants in addition to the peer node 12, then the peer node 12 may permit only the first three of the peer nodes 14-20 to accept the invitation to join the ad-hoc network.

Note that the ad-hoc network is separate from the P2P network. In this embodiment, the ad-hoc network is formed over the core network 28 and is logically distinct from the P2P network. Alternatively, the ad-hoc network may be formed over a physically distinct core network. In one embodiment, the ad-hoc network is a VPN and may be established using any VPN or Darknet protocol. Note that if the ad-hoc network is a VPN, the VPN is preferably hosted by the initiating peer node, which is the peer node 12. Alternatively, the ad-hoc network may be another P2P network or a network configured in a client/server arrangement. If configured in a client/server arrangement, the initiating node, which in this example is the peer node 12, preferably operates as the server. Since the protocols for establishing VPNs, Darknets, P2P networks, and client/server networks are known in the art, they will not be discussed herein for conciseness.

Once the ad-hoc network is established, the peer nodes 12-20 communicate with one another via the ad-hoc network rather than via the P2P network. For example, the peer nodes 12-20 may interact via emails or voice or text messages, transfer files, or share resources. Depending on the configuration of the ad-hoc network, the peer nodes 14-20 may only communicate with the peer node 12, the peer nodes 14-20 may communicate with the peer node 12 or with one another via the peer node 12, or the peer nodes 12-20 may be enabled to communicate with one another directly.

Optionally, after the ad-hoc network is established, each of the peer nodes 12-20 in the ad-hoc network may be enabled to request the content information for the others of the peer nodes 12-20 and decide whether to remain in the ad-hoc network based on the content information.

Figure 4:
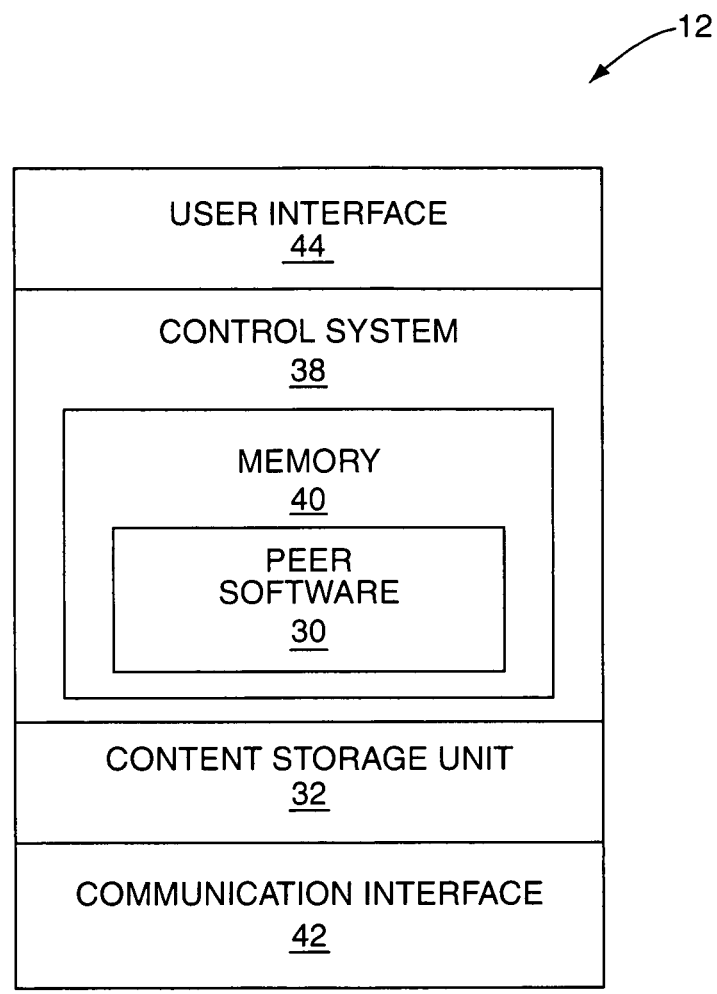
FIG. 4 is a block diagram of an exemplary embodiment of a peer node according to one embodiment of the present invention.

FIG. 4 is a block diagram of the peer node 12. In general, the peer node 12 includes a control system 38 and associated memory 40. The memory 40 stores the peer software 30. The peer node 12 also includes the content storage unit 32 which may be implemented as RAM or as a storage device such as a hard disc drive. Alternatively, the content storage unit 32 may be implemented in the memory 40. The peer node 12 also includes a communication interface 42 for communicating with other network entities via the core network 28 (FIG. 1). The peer node 12 also includes a user interface 44 which may include one or more components such as a display, speakers, a microphone, a keyboard or keypad, or the like.

The present invention provides substantial opportunity for variation without departing from the spirit or scope of the present invention. For example, referring to FIG. 3, steps 106 and 108 may be optional. After receiving the responses from the receiving peer nodes that desire to join the ad-hoc network, the initiating peer node may decide whether to permit the receiving peer nodes to join the ad-hoc network based on their compatibility scores and/or their content information. If the initiating peer node decides to permit the receiving peer nodes to join the ad-hoc network, the initiating peer node may proceed to establish the ad-hoc network rather than sending invitations and waiting for acceptances as described above. Still further, the responses from the receiving peer nodes in step 104 may not include content information or compatibility scores, and the initiating peer node may establish the ad-hoc network with all of the receiving nodes that respond or with the first N of the receiving nodes that respond.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   identifying at least one participating node for an ad-hoc network from a plurality of peer nodes in a peer-to-peer network using the peer-to-peer network;
   providing a request from an initiating peer node for participants for the ad-hoc network to the plurality of peer nodes using the peer-to-peer network, the request including content information describing content stored on the initiating peer node; and
   establishing the ad-hoc network with the at least one participating node, the ad-hoc network being logically separate from the peer-to-peer network, wherein the at least one participating node decides whether to join the ad-hoc network based on the content information.

2. The method of claim 1 wherein identifying the at least one participating node further comprises:
   receiving a response from each of at least one receiving peer node from the plurality of peer nodes including the at least one participating node, wherein the response includes a compatibility score provided by the at least one receiving peer node based on a comparison of the content information for the initiating peer node and content information for the at least one receiving peer node;
   selecting at least one invited peer node from the at least one receiving peer node based on the compatibility scores, the at least one invited peer node comprising the at least one participating node;
   inviting the at least one invited peer node to join the ad-hoc network; and
   receiving an acceptance from each of the at least one participating node in response to inviting the at least one invited peer node to join the ad-hoc network.

3. The method of claim 2 wherein selecting the at least one invited peer node comprises automatically selecting the at least one invited peer node based on a comparison of the compatibility score from the at least one receiving peer node to a threshold value.

4. The method of claim 2 wherein selecting the at least one invited peer node comprises:
   displaying the compatibility scores from the at least one receiving peer node to a user of the initiating peer node; and
   receiving a selection of the at least one invited peer node from the user of the initiating peer node.

5. The method of claim 2 wherein inviting the at least one invited peer node comprises sending an invitation including content information for each of the at least one invited peer node to the at least one invited peer node, wherein the at least one invited peer node decides whether to accept the invitation based on the content information for each of the at least one invited peer node.

6. The method of claim 1 wherein identifying the at least one participating node further comprises:
   receiving a response from each of at least one receiving peer node including the at least one participating node, wherein the response includes content information describing the content stored by the at least one receiving peer node;
   selecting at least one invited peer node from the at least one receiving peer node based on the content information for the at least one receiving peer node, the at least one invited peer node comprising the at least one participating node;
   inviting the at least one invited peer node to join the ad-hoc network; and
   receiving an acceptance from each of the at least one participating node in response to inviting the at least one invited peer node to join the ad-hoc network.

7. The method of claim 6 wherein selecting the at least one invited peer node comprises automatically selecting the at least one invited peer node based on examining the content information from the at least one receiving peer node for at least one secret criterion defined by a user associated with the initiating peer node.

8. The method of claim 6 wherein selecting the at least one invited peer node comprises:
   displaying the content information from the at least one receiving peer node to a user of the initiating peer node; and
   receiving a selection of the at least one invited peer node from the user of the initiating peer node.

9. The method of claim 6 wherein inviting the at least one invited peer node comprises sending an invitation including content information for each of the at least one invited peer node to the at least one invited peer node, wherein the at least one invited peer node decides whether to accept the invitation based on the content information for each of the at least one invited peer node.

10. A method for establishing an ad-hoc network comprising:
    receiving a request for participants for the ad-hoc network at a receiving peer node from an initiating peer node via a peer-to-peer network comprising the receiving peer node and the initiating peer node, the request including content information describing content stored by the initiating peer node;
    deciding whether to join the ad-hoc network based on the content information; and
    providing a response to the initiating peer node if the receiving peer node decides to join the ad-hoc network.

11. The method of claim 10 wherein deciding whether to join the ad-hoc network comprises:
    comparing the content information for the initiating peer node to content information describing content stored by the receiving peer node to provide a compatibility score; and
    deciding whether to join the ad-hoc network based on the compatibility score.

12. The method of claim 11 wherein deciding whether to join the ad-hoc network comprises automatically deciding whether to join the ad-hoc network based on a comparison of the compatibility score to a threshold value.

13. The method of claim 11 wherein deciding whether to join the ad-hoc network comprises:
    displaying the compatibility score to a user of the receiving peer node; and
    receiving a selection as to whether to join the ad-hoc network from the user of the receiving peer node.

14. The method of claim 11 wherein providing the response comprises providing the compatibility score to the initiating peer node, wherein the initiating peer node decides whether to invite the receiving peer node to join the ad-hoc network based on the compatibility score.

15. The method of claim 14 further comprising:
receiving an invitation to join the ad-hoc network from the initiating peer node, the invitation including content information describing content stored by each of a plurality of invited peer nodes comprising the receiving peer node;
deciding whether to accept the invitation based on the content information for each of the plurality of invited peer nodes; and
providing an acceptance to the initiating peer node if the receiving peer node decides to accept the invitation, wherein the initiating peer node establishes the ad-hoc network in response to receiving the acceptance.

16. The method of claim 10 wherein providing the response comprises providing content information describing content stored by the receiving peer node, wherein the initiating peer node decides whether to invite the receiving peer node to join the ad-hoc network based on the content information for the receiving peer node.

17. The method of claim 16 further comprising:
receiving an invitation to join the ad-hoc network from the initiating peer node, the invitation including content information describing content stored by each of a plurality of invited peer nodes comprising the receiving peer node;
deciding whether to accept the invitation based on the content information for each of the plurality of invited peer nodes; and
providing an acceptance to the initiating peer node if the receiving peer node decides to accept the invitation, wherein the initiating peer node establishes the ad-hoc network in response to receiving the acceptance.

18. A network node for establishing an ad-hoc network comprising:
a) a communication interface; and
b) a control system communicatively coupled to a core network via the communication interface and adapted to:
i) establish communication with a peer-to-peer network via the core network;
ii) identify at least one participating node for the ad-hoc network from a plurality of peer nodes in the peer-to-peer network using the peer-to-peer network;
iii) provide a request for participants for the ad-hoc network to the plurality of peer nodes using the peer-to-peer network, the request including content information describing content stored on the network node; and
iv) establish the ad-hoc network with the at least one participating node, the ad-hoc network being logically separate from the peer-to-peer network, wherein the at least one participating node decides whether to join the ad-hoc network based on the content information.

* * * * *